(12) United States Patent
Do

(10) Patent No.: US 10,003,137 B2
(45) Date of Patent: Jun. 19, 2018

(54) ELECTRICAL CONNECTOR BOX

(71) Applicant: Man Khac Do, Federal Way, WA (US)

(72) Inventor: Man Khac Do, Federal Way, WA (US)

(73) Assignee: Man Khac Do, Federal Way, WA (US)

( * ) Notice: Subject to any disclaimer, the term of this patent is extended or adjusted under 35 U.S.C. 154(b) by 0 days. days.

(21) Appl. No.: 15/418,689

(22) Filed: Jan. 28, 2017

(65) Prior Publication Data
US 2017/0271785 A1    Sep. 21, 2017

Related U.S. Application Data

(63) Continuation-in-part of application No. 13/726,114, filed on Dec. 22, 2012, now Pat. No. 9,293,903.

(51) Int. Cl.
*H02G 3/16* (2006.01)
*H01R 13/46* (2006.01)
*H01R 4/38* (2006.01)

(52) U.S. Cl.
CPC ..................................... *H01R 4/38* (2013.01)

(58) Field of Classification Search
CPC    H02G 3/08; H02G 3/081; H02G 3/16; H02G 15/00; H02G 15/06; H02G 15/076; H02G 15/08; H01R 4/34; H01R 4/30; H01R 13/40; H01R 13/22; H01R 4/38
USPC .. 174/480, 481, 50, 53, 57, 58, 59, 60, 482, 174/64, 487, 490, 559; 220/3.2–3.9, 220/4.02; 439/535, 536, 75.1, 76.2, 720, 439/721, 722
See application file for complete search history.

(56) References Cited

U.S. PATENT DOCUMENTS

| | | | | | |
|---|---|---|---|---|---|
| 3,848,224 | A | * | 11/1974 | Olivero | H02G 3/16 174/59 |
| 4,195,194 | A | * | 3/1980 | Kuster | H02G 3/16 174/59 |
| 6,333,464 | B1 | * | 12/2001 | Ellison | H01R 13/6215 174/92 |
| 6,376,774 | B1 | * | 4/2002 | Oh | H01H 85/10 174/92 |
| 6,733,345 | B2 | * | 5/2004 | Weise | H01R 9/24 174/50 |
| 7,339,121 | B2 | * | 3/2008 | Krauss | H02G 3/086 174/60 |
| 9,293,903 | B2 | * | 3/2016 | Do | H02G 3/16 |

* cited by examiner

*Primary Examiner* — Angel R Estrada
(74) *Attorney, Agent, or Firm* — Man Khac Do

(57) ABSTRACT

This device is the modification of my U.S. Pat. No. 9,293, 903, date: Mar. 22, 2016. A convenient electrical connector box will be used for repairing a broken household electrical line, or connecting an existing electrical line to new multiple locations. It provides all components in a package for completing a task. The package will include an electrical connector unit, a cover for enclosing the entire electrical connector unit, screws for securing the electrical connector box on a building structure, and screws for attaching the cover to the electrical connector unit. The electrical connector box can be mounted on a building structure in an open space such as the attic, crawlspace, or outer wall of a frame of a building or similar structure.

5 Claims, 20 Drawing Sheets

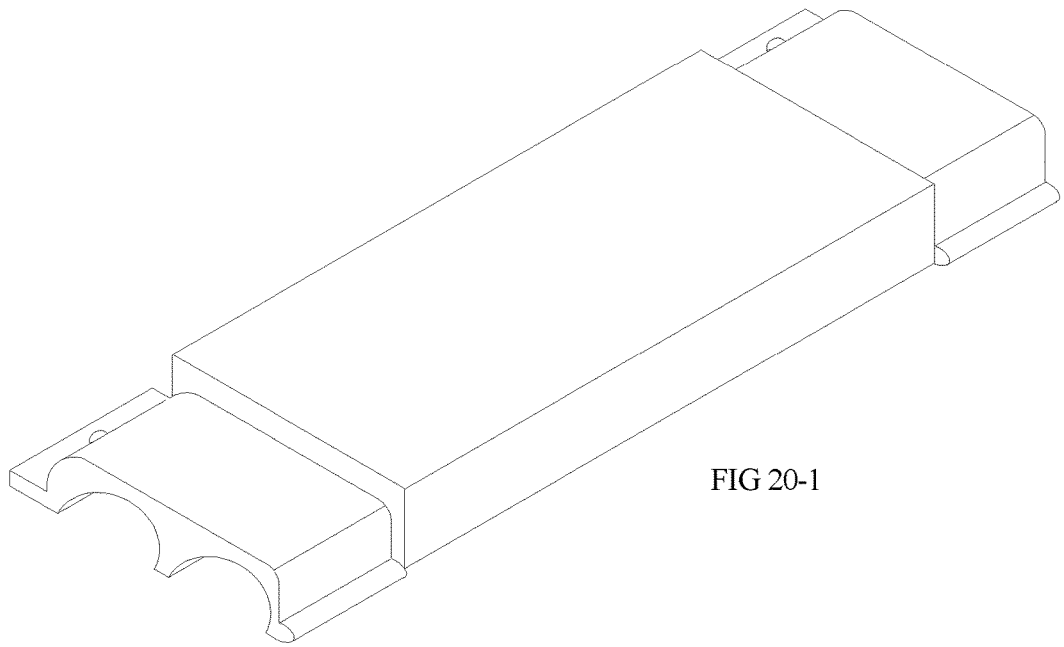
FIG 20-1
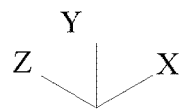
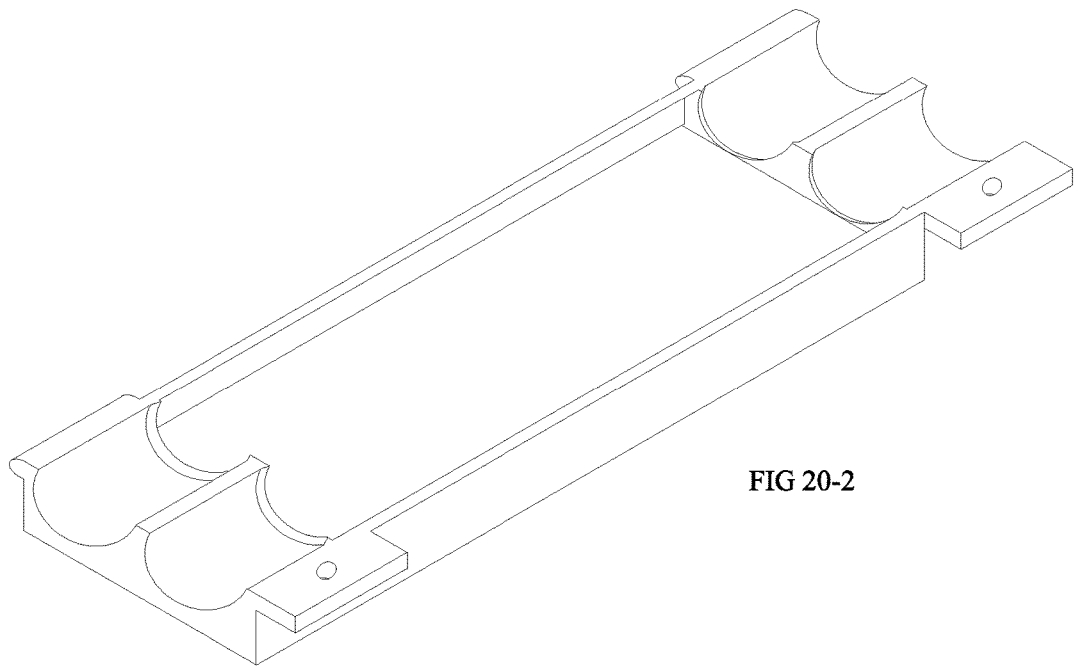
FIG 20-2

ELECTRICAL CONNECTOR BOX

TECHNICAL FIELD

This invention is generally relating to electrical connection, more particularly, use in repairing damage electrical wires, or provides a convenience to branch an electrical wire to a different location in a building structure.

BACKGROUND

In light of a building frame structures, such as houses, buildings, electrical wires are deployed after the structure is built, and the applicable codes require that the electrical wire must be secured to the beams using u-shape nails.

When an electrical wire is installed in a building structure, it is stretched out and secured onto the structure as illustrated in FIG. 1-1 Prior Art. If this electrical wire was cut as illustrated in FIG. 1-2 Prior Art, or need to connect an extra electrical wire to an existing wire as illustrated in FIG. 1-3 Prior Art.

Unfortunately, the stretched and secured wire in the existing structure normally does not provide spare length for twisting together in the reparation as illustrated in FIG. 1-3 Prior Art. parts 1 and 2. A portion of electrical wire (3), about a foot long, has to be added and other parts have to be purchased separately for the reparation. The following listed parts are needed:

Two net work boxes, 39 cents for each=$0.78
Electrical wire, $8.52 per 15 ft=$8.52
Two net work box covers, $1.29 for ea=$2.58
A bag of wing twists (25 pieces per bag)=$2.60

The total cost of the material will be approximately $14.48[1].
The process of the job is described below.

Price is collected from Lowes at 35425 Enchanted Pkwy S Federal Way, Wash. 98003, March 2013

As illustrated in FIG. 1-3 Prior Art, the repairing such a cutting electrical wire, about ½ an inch of the insulator on the ends of the wires needs stripped off, twisted, and held together with wing twists. Juncture boxes 1 and 2 contain the twisting connections of the electrical wires. Part 3 is the portion of electrical wires that need to be added between the two juncture boxes to extend the length of the wires so that they can be twisted together by wing twists. Part 4 is the input electrical wire. Part 5 is the output of the electrical wire. Part 6 is the new electrical wire connected to an existing electrical wire.

This repairing and connecting method would be costly and time consuming for home owners and electrical technicians. Also, the electrical wire would easily get loose and might arc to cause fire.

The invention of the Electrical Connector Box (ECB) will provide a more secure and easier way to repair a broken electrical wire, or connect an electrical wire to an existing electrical wire. It is a better way to eliminate the arcing of a loose electrical connection. It also can be used to extent or to branch electrical wire to a new location.

SUMMARY OF THE INVENTION

The ECB is an invention for repairing or to extending electrical wires in an open space in a wooden frame structure such as attic, crawl space, or outside wall of a building structure. It will simplify the working process, reduce the cost, and limit the cause of the fire hazard. The ECB will provide all the necessary components in a package for repairing a broken wire, branch, or extend a wire to a new location.

The conducting components of the ECB are about three (3) inches long. This provides electrical wire length for the connections.

The ECB must be secured on a frame structure when it is used.

The device in FIG. F8-2 is used to prepare a single broken electrical wire. The device in FIG. 18 is used to add to the existing electrical wire a new electrical wire and branch it to a new location. However, device in FIG. 18 can be used in place of device in FIG. 8-2. A ½ inch insulator of both ends of the wire will be stripped off, insert the naked part of the wire into the tubes as shown in FIG. 2-3 part 2, and the screw is tied down to secure the wires in place. Part 1 in FIG. 2-3 is insulated part of the wire.

The device in FIG. 12 is used for one to one connection that needs conduit. The device in FIG. 22 is used for one to multiple connections that needed conduit.

After the wires are secured in the conductor unit of the ECB, the cover is installed to cover and secure it from the surrounding environment.

A convenient electrical connector box of this type is used to interconnect power wires to which appliances or other equipment can be attached.

BRIEF DESCRIPTION OF THE DRAWINGS

FIG. 1-2 illustrates a broken electrical wire stretched out on a wooden bean.

FIG. 1-3 illustrates how a broken electrical wire is currently repaired, and an additional electrical wire was connected.

FIG. 2-1 illustrates the one to one conductor unit.

FIG. 2-2 illustrates the partial section of the conductor unit.

FIG. 2-3 illustrates the electrical connection and security of the wire in a conductive tube.

FIG. 3-1 illustrates the cap that covers and seals the conductor unit to the base.

FIG. 3-2 illustrates the cap in FIG. 3-1 rotation at 180 degree around X-axis.

FIG. 3-3 illustrates the partial sectional view of the cap.

FIG. 5-1 illustrates the cover of the one to one ECB.

FIG. 5-2 illustrates the sectional view of the cover of the one to one ECB.

FIG. 7-1 illustrates the assembly of the conductor units on the base.

FIG. 7-2 illustrates the electrical connector unit.

FIG. 8-2 illustrates the completed one to one electrical connector box (ECB).

FIG. 9-1 illustrates the base with half female conduit connector.

FIG. 9-2 illustrates the base in FIG. 9-1 rotation at 180 degree around the Y-axis.

FIG. 9-3 illustrates the electrical connector unit with half female conduit.

FIG. 10-1 illustrates the cover of ECB with half female conduit connector.

FIG. 10-2 illustrates the cover in FIG. 10-1 rotation at 180 degree around the X-axis.

FIG. 13-1 illustrates the double conductor unit.

FIG. 13-2 illustrates the partial cross section view of the double conductor unit.

FIG. 13-3 illustrates the partial section view along the length of the double conductor unit.

FIG. 13-4 illustrates another section view of the double conductor unit with a crew attached to it.

FIG. 14-1 illustrates the cap that covers and seals the double conductor units to the base.

FIG. 14-2 illustrates the cap in FIG. 14.1 rotation at 180 degree around the X-axis.

FIG. 17-1 illustrates the installation of the double connector units to the base.

FIG. 17-2 illustrates the one to three electrical connector unit.

FIG. 19-1 illustrates the base of the double conductor unit with half female conduit connector.

FIG. 19-2 illustrates the base in FIG. 19-1 with 180 degree rotation around the Y-axis.

FIG. 20-1 illustrates the cover of the one to three ECB with half female conduit.

FIG. 20-2 illustrates the base in FIG. 20-1 with 180 degree rotation around the X-axis.

DETAIL DESCRIPTION OF THE ELECTRICAL JUNCTURE BOX

Figure 1:
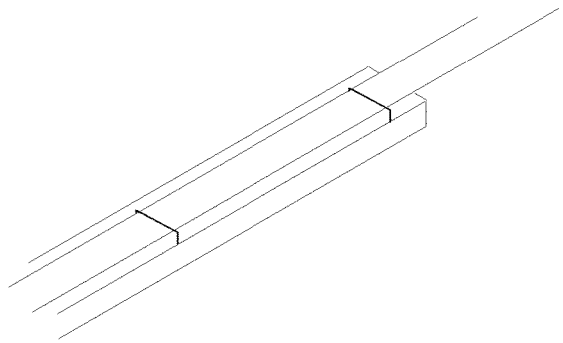
FIG. 1-1 illustrates a stretched out and secured electrical wire on a wooden beam.
Figures 1, 2:
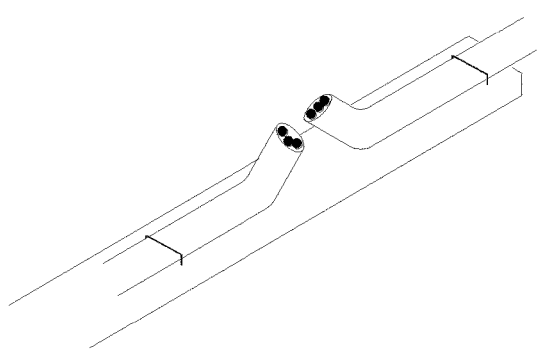

FIG. 2-1 illustrates a one to one conductor unit. There is a conductor tube (4) connecting to each end of a piece of solid conductor wire (3). They are used to hold naked electrical wire. These tubes also connect to threaded holes (2) that are used to hold the screws (1) that secure the electrical wire. The size of the screw is the same size of the screw in house hood electrical outlet. The screw is used to secure the conductor wire in the conductor tube.

FIG. 2-2 illustrates the sectional view to show connection of the tube to a solid conductor wire, and the threaded holes.

Figures 1, 2, 3:
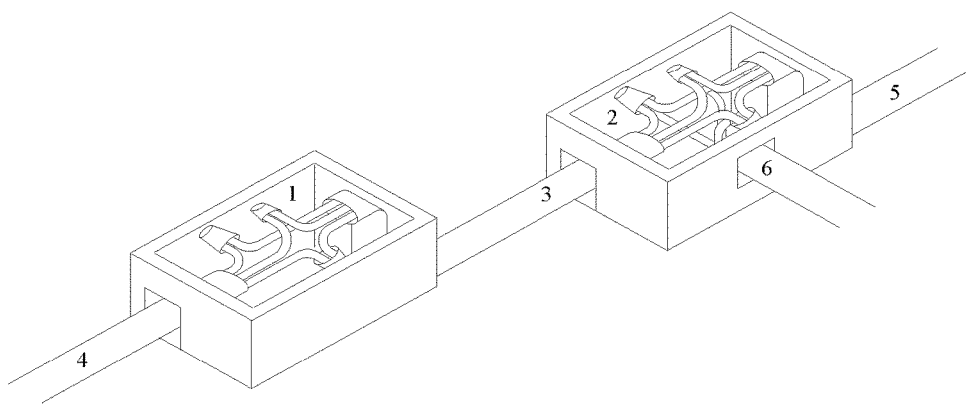
Figures 1, 2:
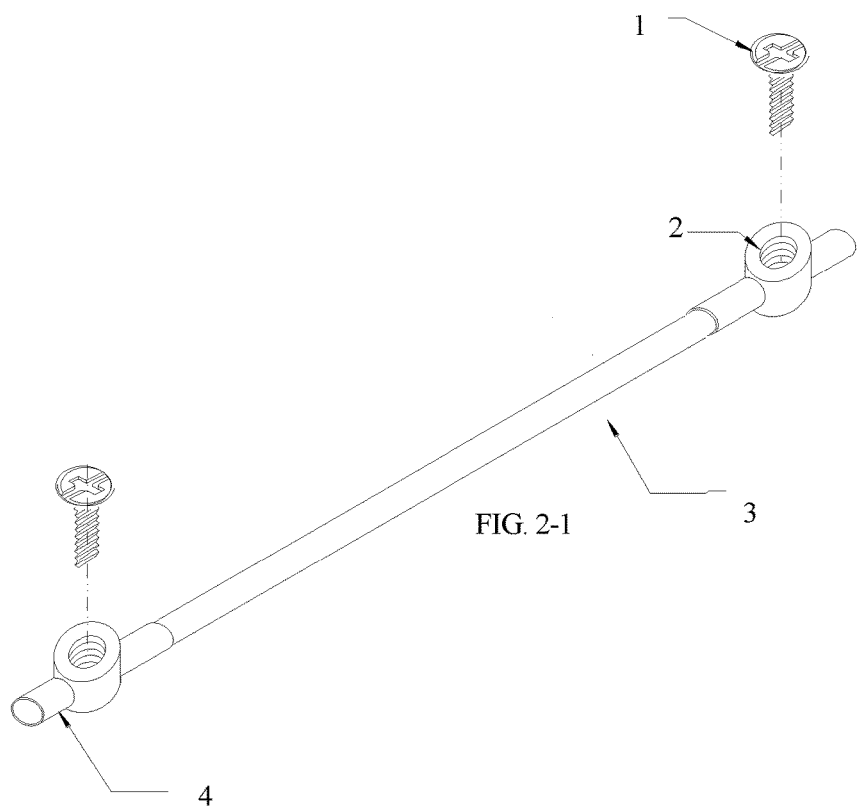
Figure 2:
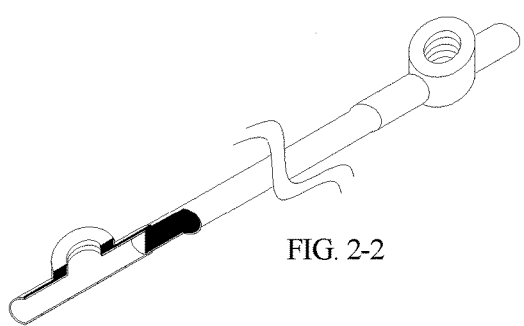
Figures 2, 3:
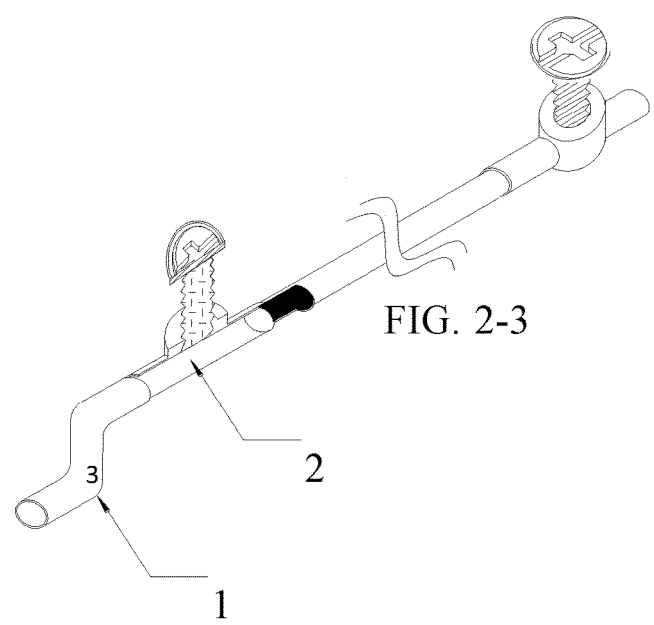
Figures 1, 3:
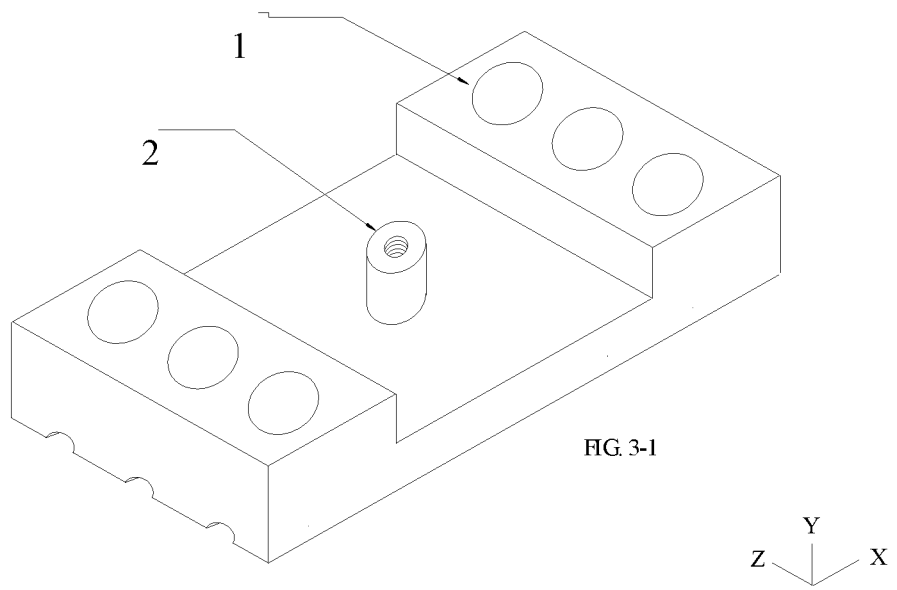
Figures 2, 3:
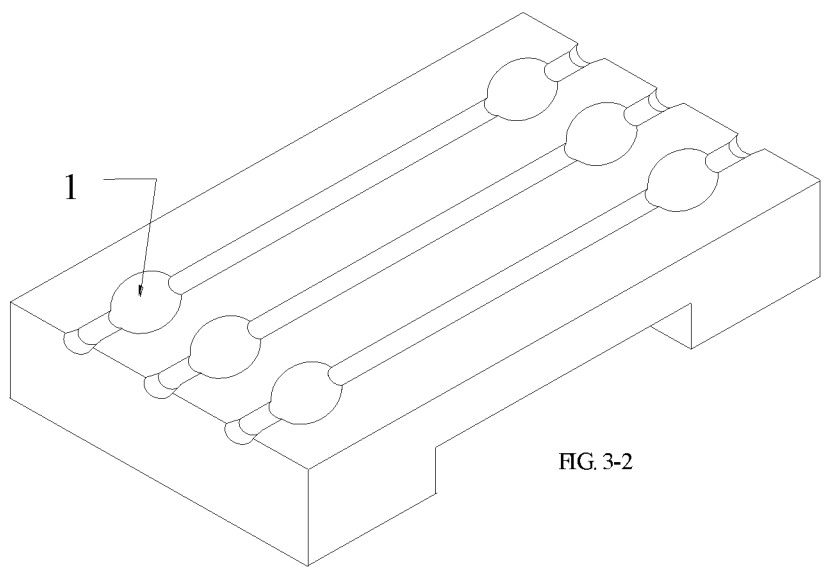
Figure 3:
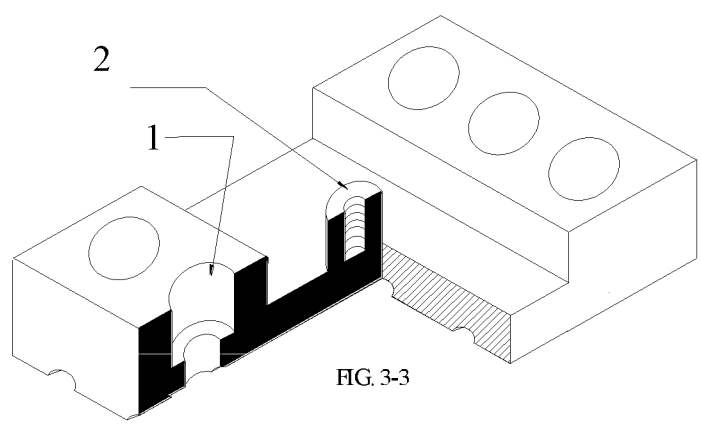

FIG. 2-3 illustrates the connection of the electrical wire in the tube, and is secured by a screw. Part 1 shows the connection of an electrical wire through the tube of the conductor unit and is secured by the screw. Part 2 shows the insulated part of the wire.

FIG. 3-1 illustrates the cap that will be covered and sealed the conductor unit on the base to form a electrical connector unit. Part 1 is the holes for screws that secure the electrical wire to go through. Part 2 is the threaded hold for the screw that secures the cover.

FIG. 3-2 illustrates the cap in FIG. 3-1 with 180 degree rotation around the X-axis. Part 1 is the supported plates for electrical wire.

FIG. 3-3 illustrates the section view of the cap to show the designing of the holes that will contain the screw to secure the electrical wire. Part 1 illustrates the holes in FIG. 3-1 part 1. Part 2 illustrates the hole in FIG. 3-1 part 2.

Figure 4:
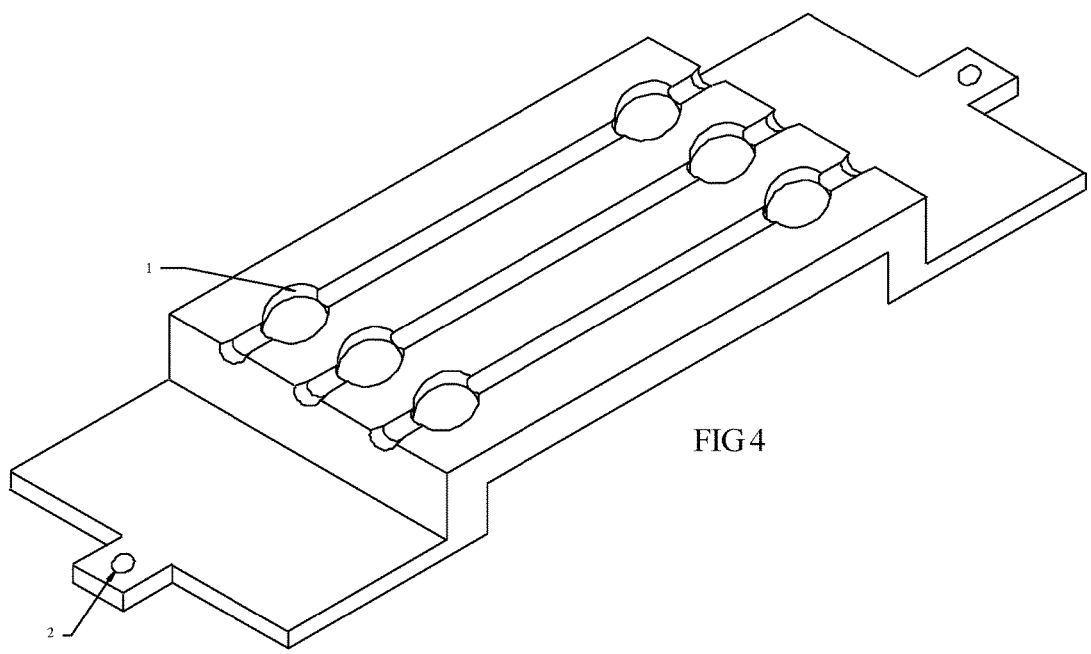
FIG. 4 illustrates the base that holding the conductor unit.

FIG. 4 illustrates the base to hold the conductor unit. Part 1 is the holding plates of the conductor unit. Part 2 is the hole for securing the base to the frame structure.

Figures 1, 5:
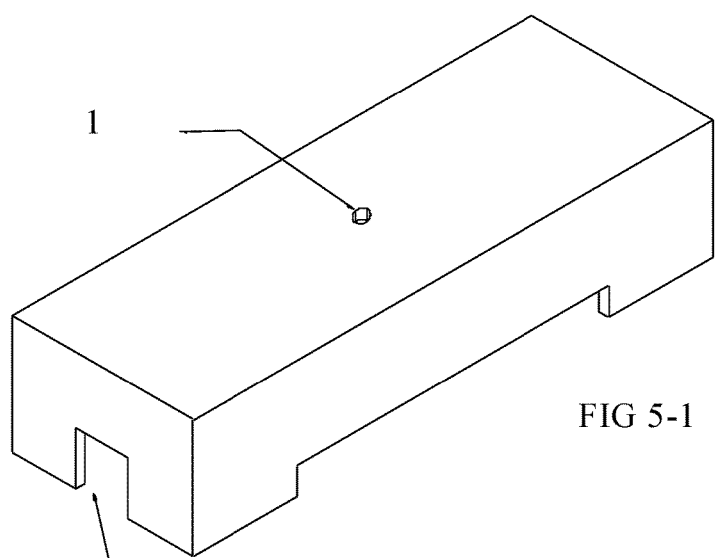
Figures 2, 5:
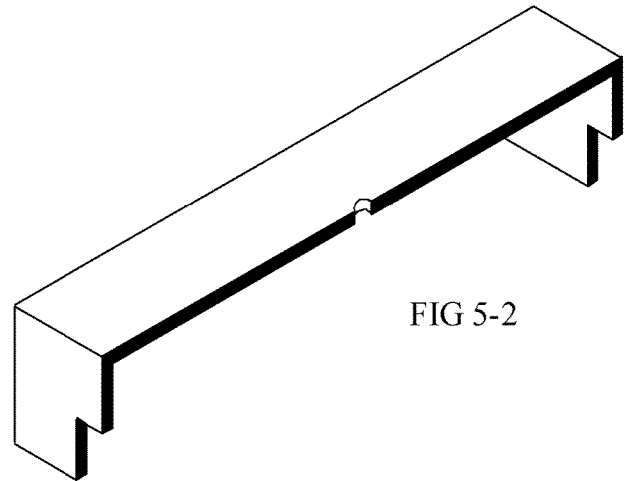

FIG. 5-1 illustrates the cover of the one to one ECB. Part 1 is the hole for the screw to go through to secure the cover on the electrical connector unit. Part 2 is the window for inserting the electrical wire.

FIG. 5-2 illustrates the sectional view of the cover of the one to one ECB.

Figure 6:
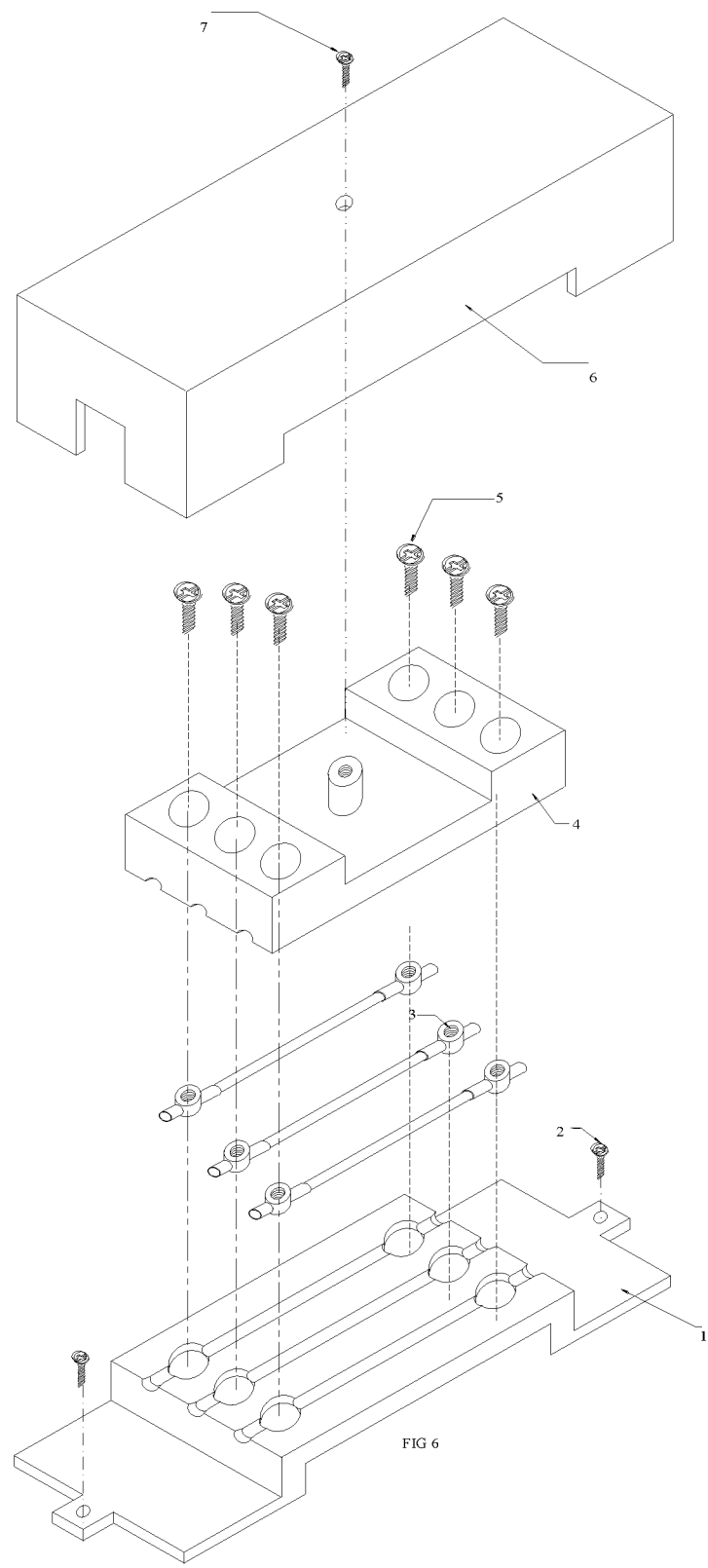
FIG. 6 illustrates the assembly process order of the ECB.

FIG. 6 illustrates the assembly process of the one to one electrical connector box. Part 1 is the base to hold the conductor unit. Part 2 is the screw to secure the ECB to frame structure. Part 3 are the conductor units. Part 4 is the cap that covers and seals the conductor unit. Part 5 are the screws to secure the electrical wires in the ECB. Part 6 is the cover. Part 7 is the screw to secure the cover on the ECB.

Figures 1, 7:
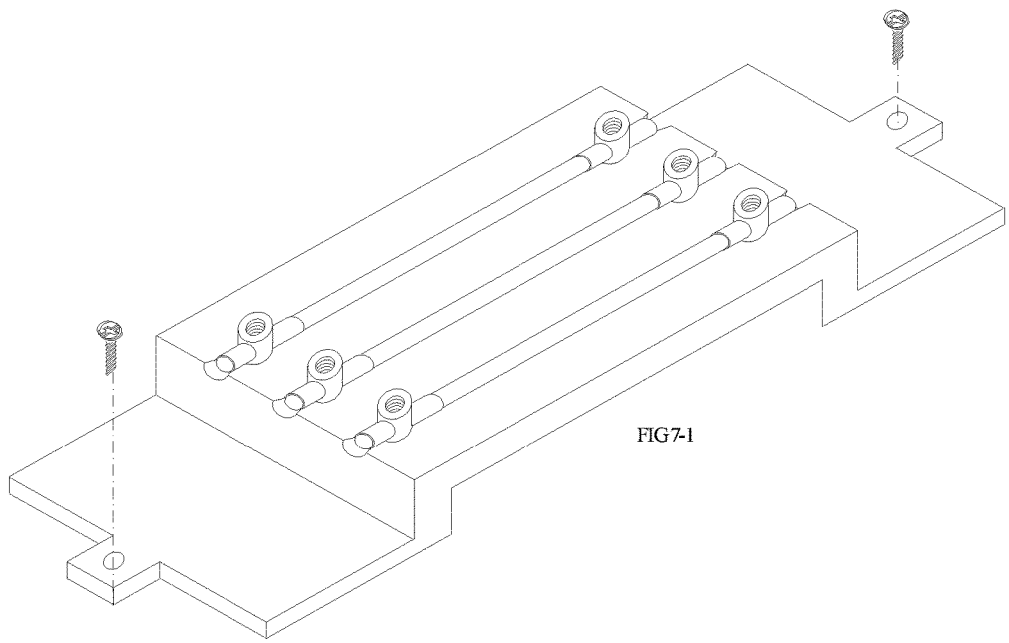
Figures 2, 7:
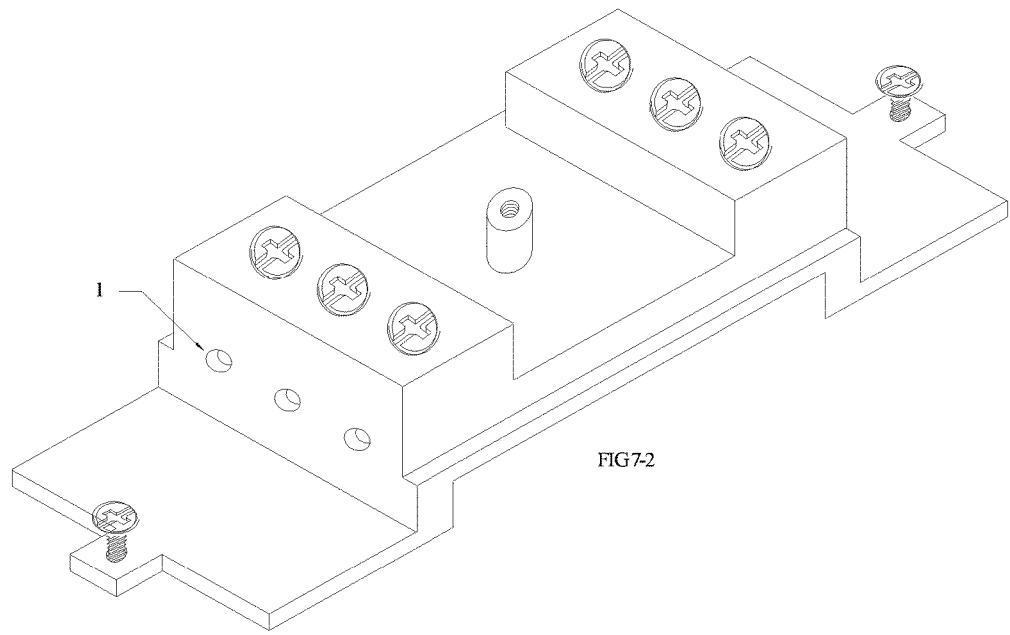

FIG. 7-1 illustrates the installation of the conductor units on the base.

FIG. 7-2. illustrates the completed electrical connector unit. The cap covers and seals the conductor unit to the base to form an electrical connector unit.

Figures 1, 8:
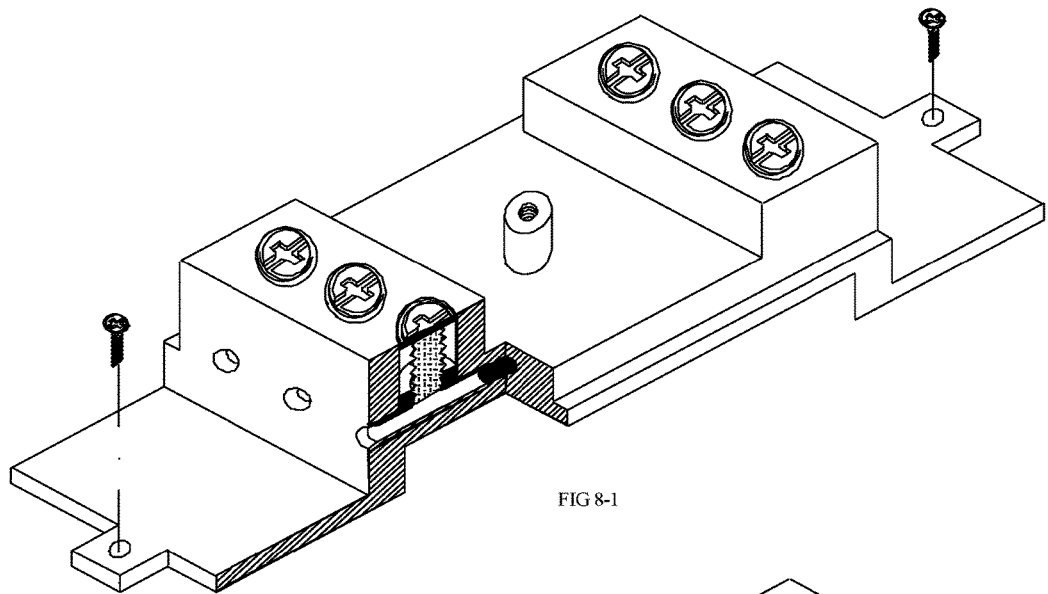
FIG. 8.1 illustrates the partial sectional view of the electrical connector unit.
Figures 2, 8:
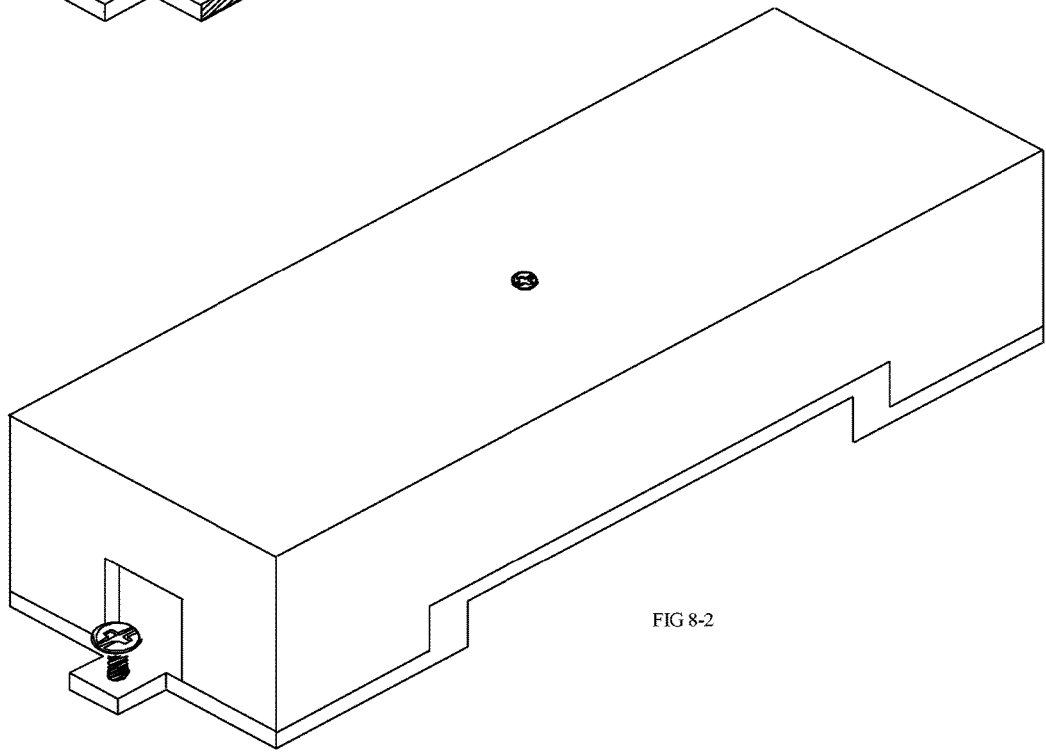

FIG. 8-1 illustrates the sectional view of an electrical conductor unit. It shows the connection of all parts together after the conductor units were sealed.

FIG. 8-2 illustrates the completed one to one electrical conductor box. This device has only one input and one output.

Figures 1, 9:
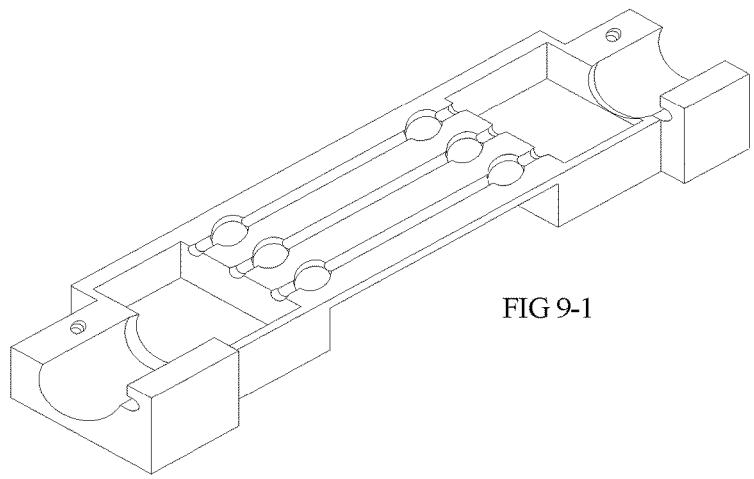
Figures 2, 9:
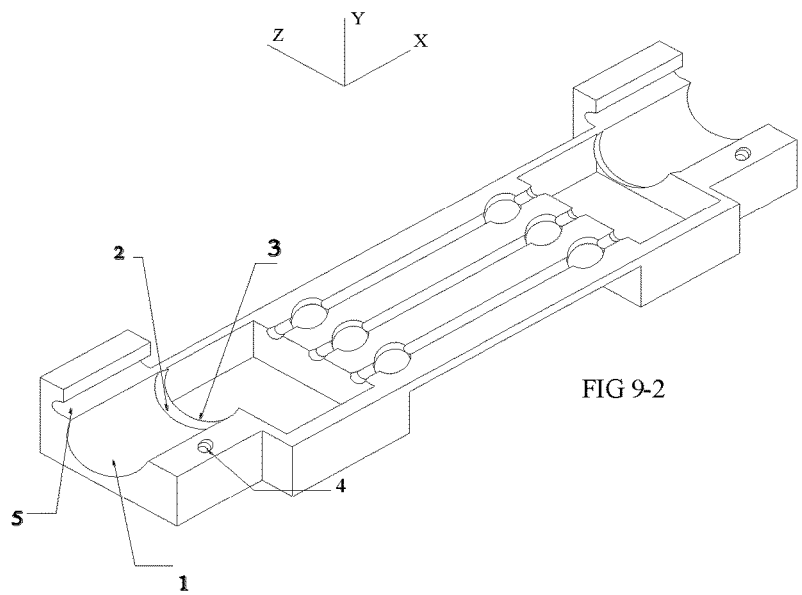
Figures 3, 9:
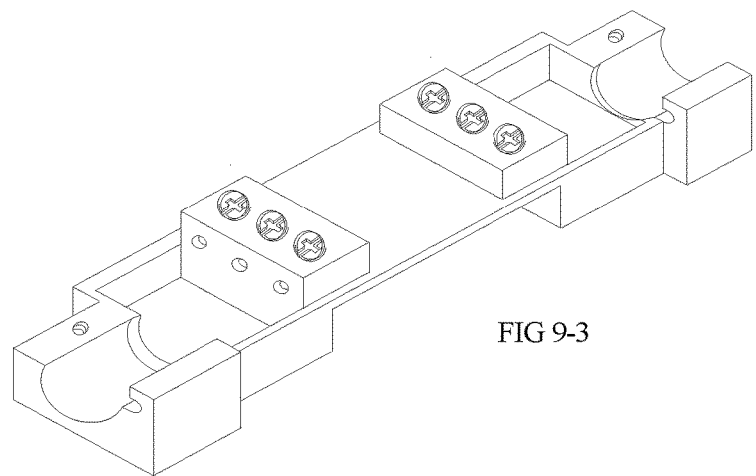

FIG. 9-1 illustrates the modification of the base in FIG. 4 to accommodate the conduit connection.

FIG. 9-2 illustrates the base in FIG. 9-1 with 180 degrees rotation around Y-axis. It has all characteristics of FIG. 4 except the following: The part 1 is the half of the female conduit connector connecting. The outer edge (2) is slightly wider than the outer diameter of the conduit, and the inner edge (3) is slightly narrower than the outer diameter of the conduit to stop the conduit from slide into the electrical conductor unit. Part 4 are the threaded holes for tying the two halves of the female conduit connector together and secure them. Part 5 are tracks for the rails on the half of the female conduit connecting to the cover to slide in.

FIG. 9-3 illustrates the electrical connector unit with female conduit connectors. It is the modification of the unit in FIG. 7-2. The detail of the assembly process of the FIG. 9-3 is illustrated in FIG. 6.

Figures 1, 10:
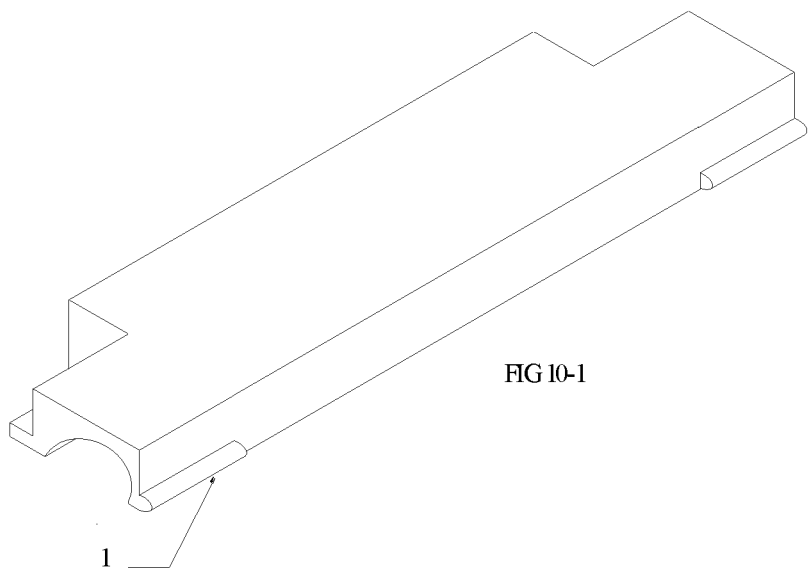
Figures 2, 10:
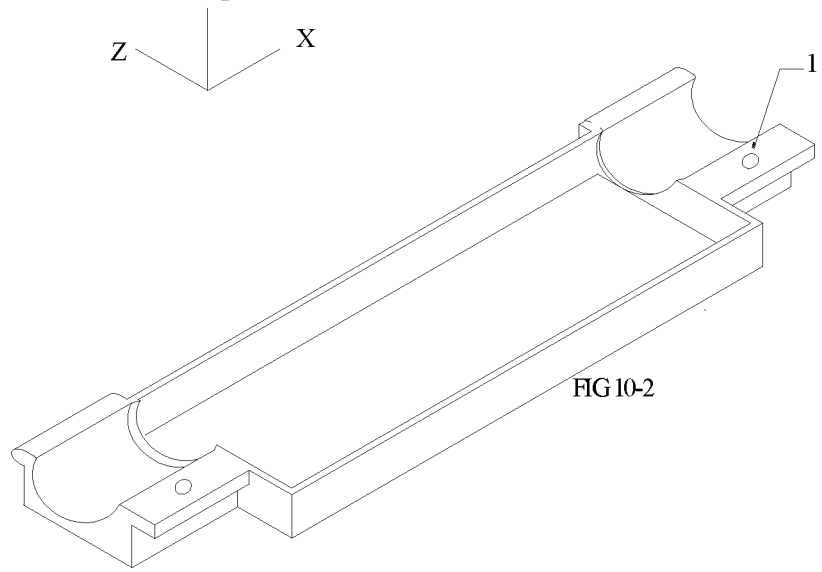

FIG. 10-1 illustrates the cover with female conduit connector. Part 1 is the rail that will go into the tracks in the other half of the female conduit.

FIG. 10-2 illustrates the cover in FIG. 10-1 with 180 degree rotation around Y-axis. Part 1 is the hole for the screw go through to tie the two part of the female conduit together.

Figure 11:
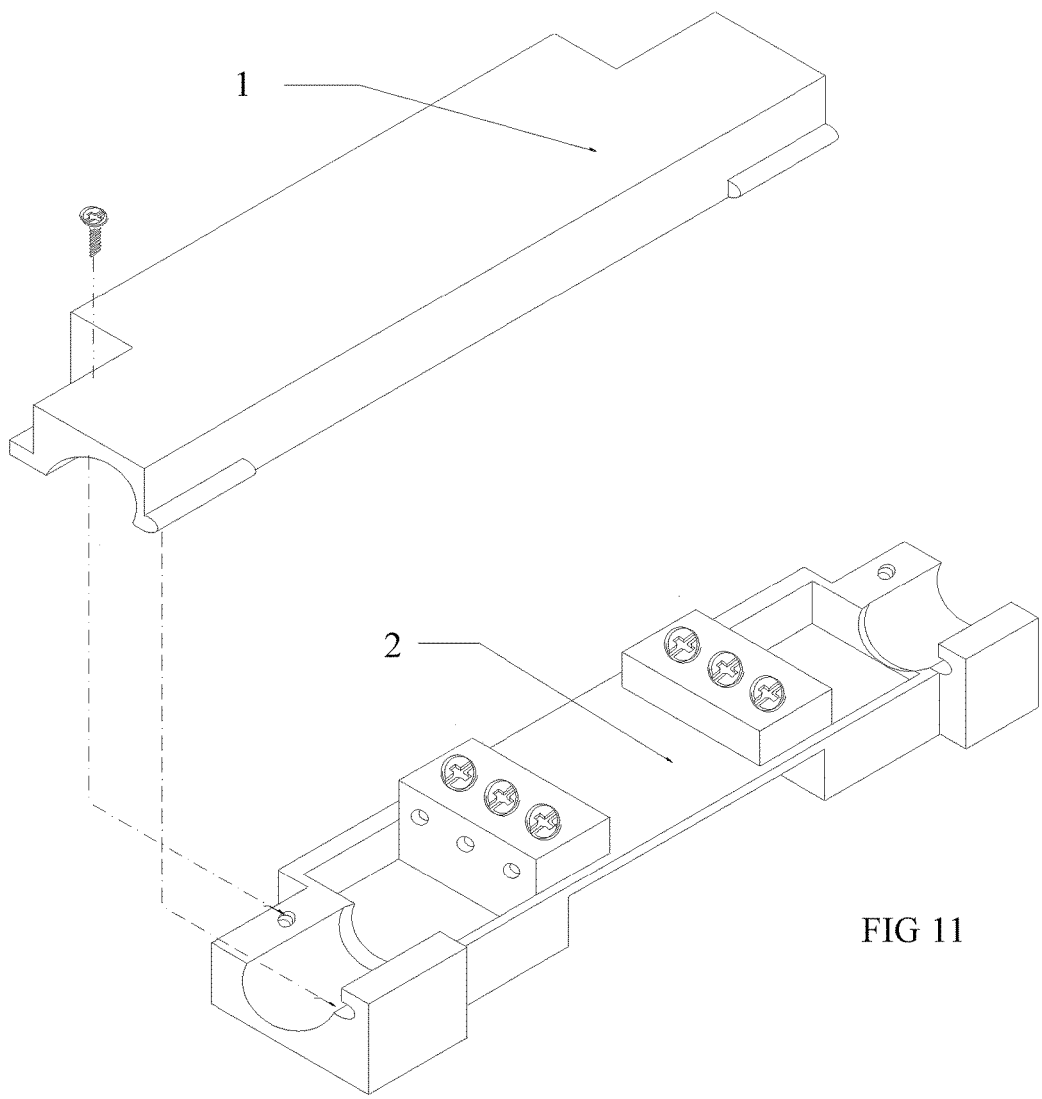
FIG. 11 illustrates the assembly process of the one to one ECB with conduit connector.

FIG. 11 illustrates the installation process of the cover on the electrical conductor unit. Part 1 is the cover. Part 2 is the electrical conductor unit.

Figure 12:
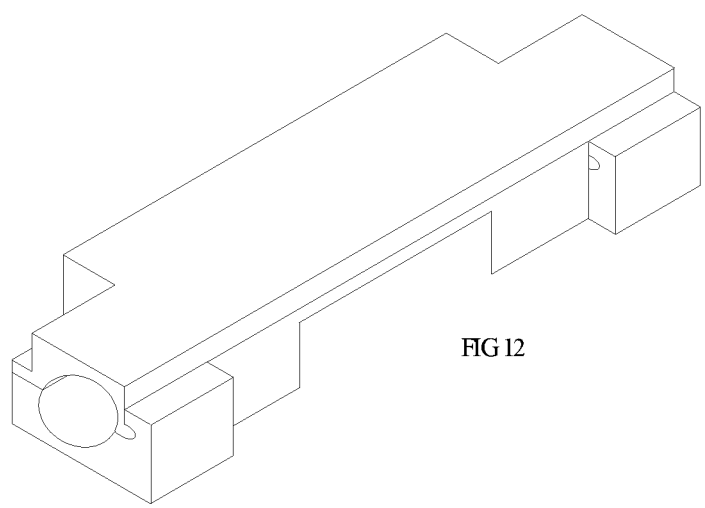
FIG. 12 illustrates the completed one to one ECB with one conduit connector.

FIG. 12 illustrates the completed one to one ECB with the conduit connectors. This device has only one input and one output.

Figures 1, 2, 3, 4, 13:
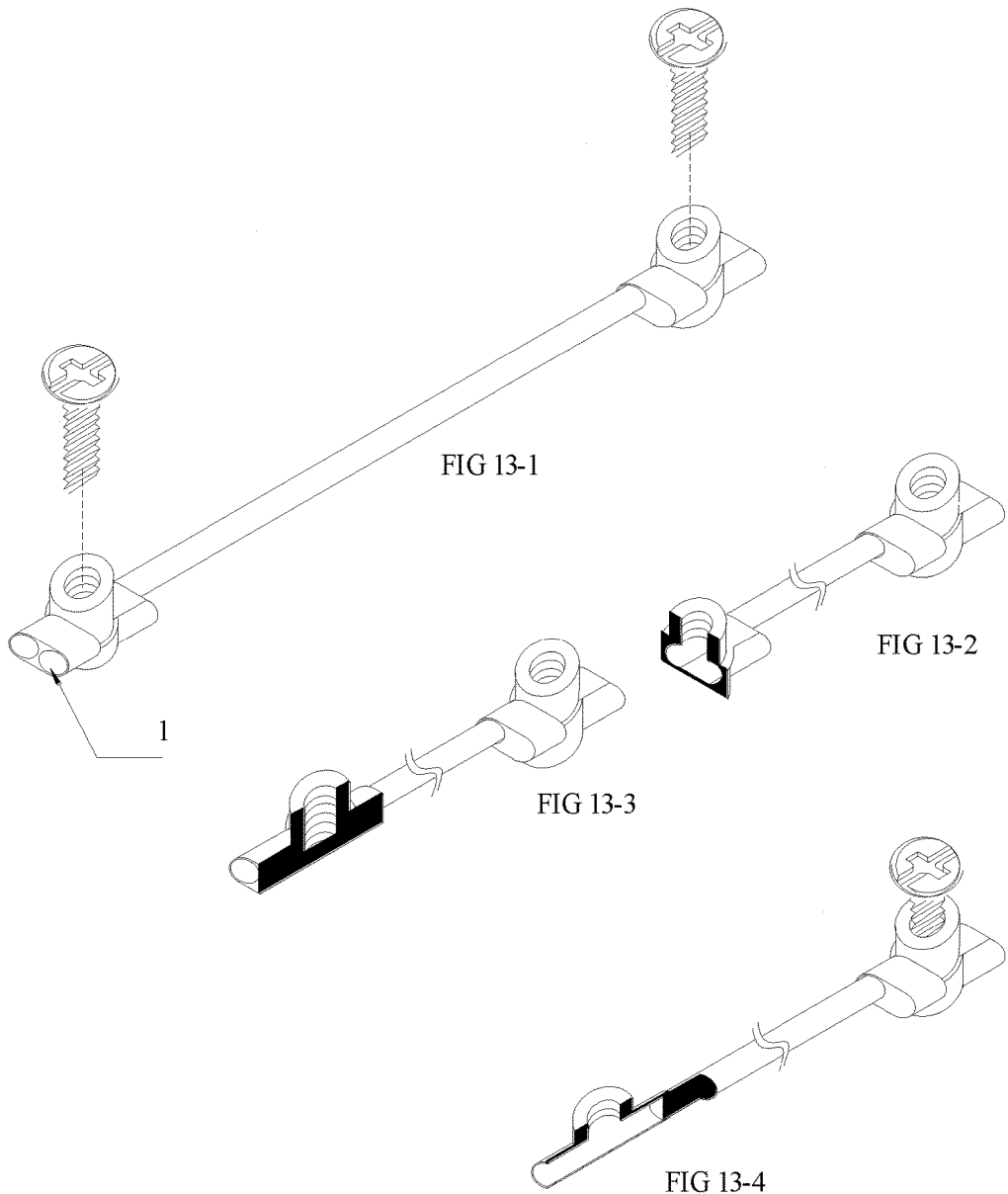

FIG. 13-1 illustrates the double connector unit. It is the duplication of the conductor unit in FIG. 2-1 and has all its characteristics, exception that it has two connector tubes conductively attaches to each other end the end. This modification allows two electrical wires connect physically and electrically to each end. Part 1 shows double connection tubes.

FIG. 13-2 illustrates the crossing sectional view to show the way the tubes connect to the threaded holes and the solid conductor wire.

FIG. 13-3 illustrates the longitude section view of double conductor unit.

FIG. 13-4 illustrates the longitude section view of the section view of FIG. 13.3.

Figures 1, 14:
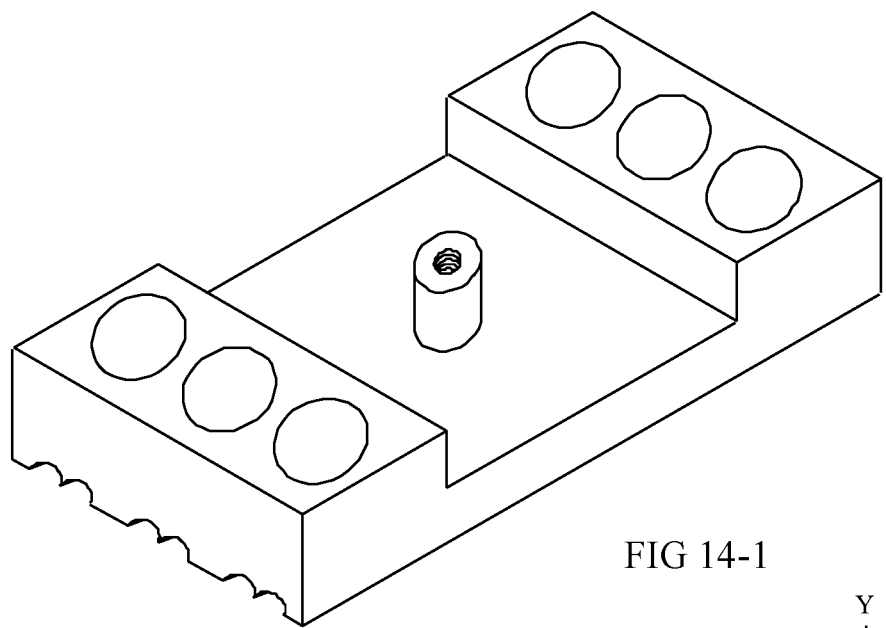
Figures 2, 14:
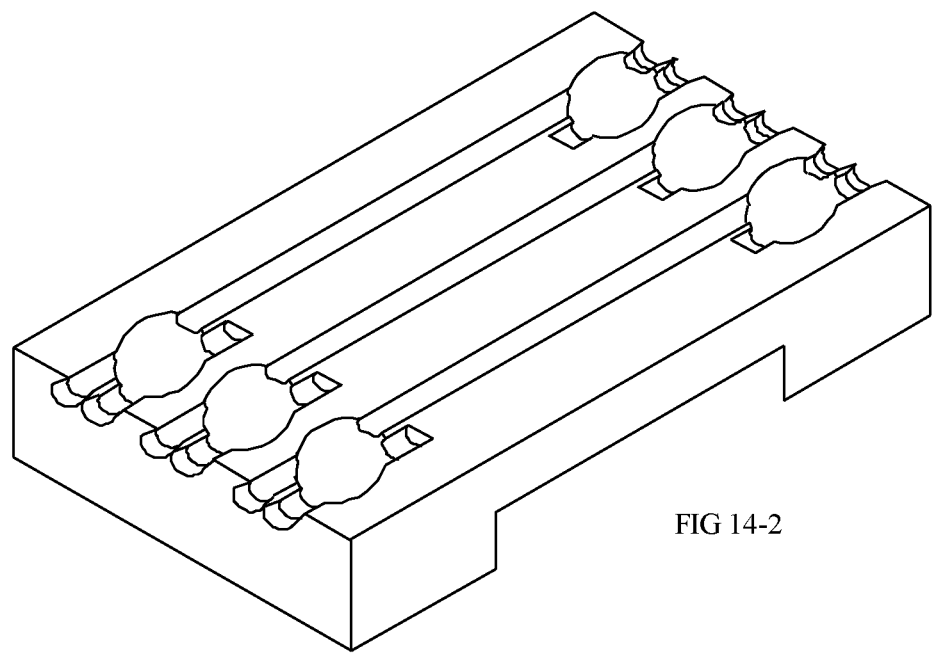

FIG. 14-1 illustrates the cap that will cover and seal the double conductor unit. This is the modification of FIG. 3-1. It has all of characteristics of FIG. 3-1 except it has double holders for the double conductor unit.

FIG. 14-2 illustrates the cap in FIG. 14-1 with 180 rotation around the X-axis.

Figure 15:
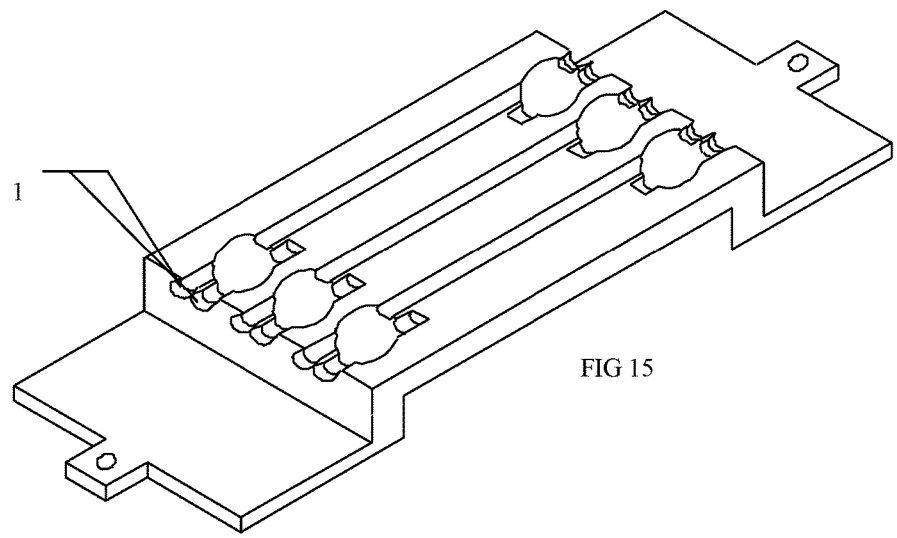
FIG. 15 illustrates the base that holds the double conductor unit.

FIG. 15 illustrates the base to hold the double conductor unit. Part 1 shows the double holders.

Figure 16:
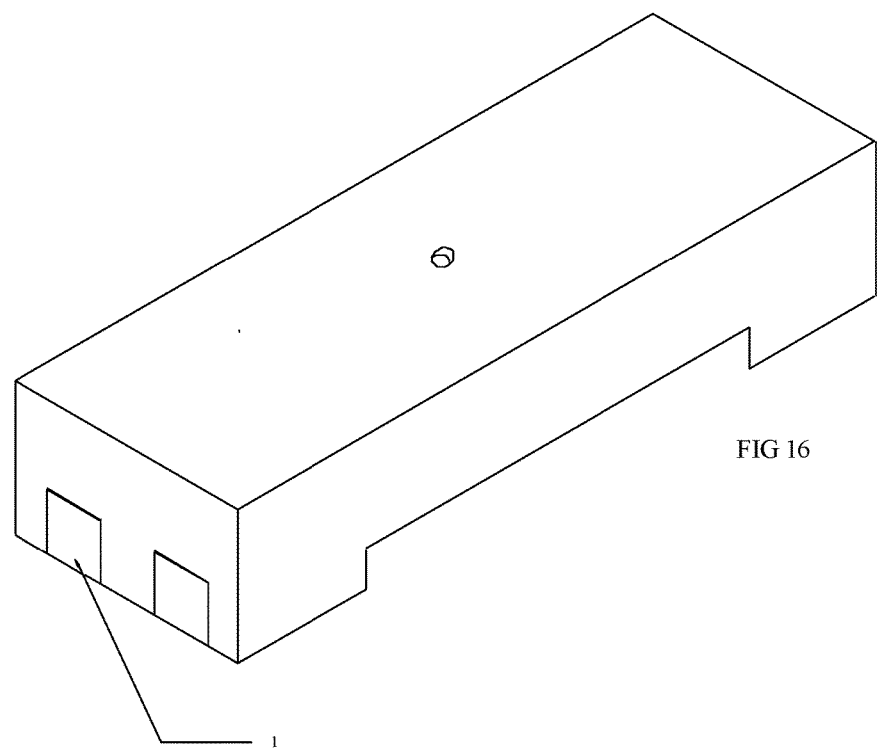
FIG. 16 illustrates the cover of the one to three ECB.

FIG. 16 illustrates the cover of the one to three ECB. Part 1 can be removed for the Installation the electrical wire. Please FIG. 5-2 for sectional view.

Figures 1, 17:
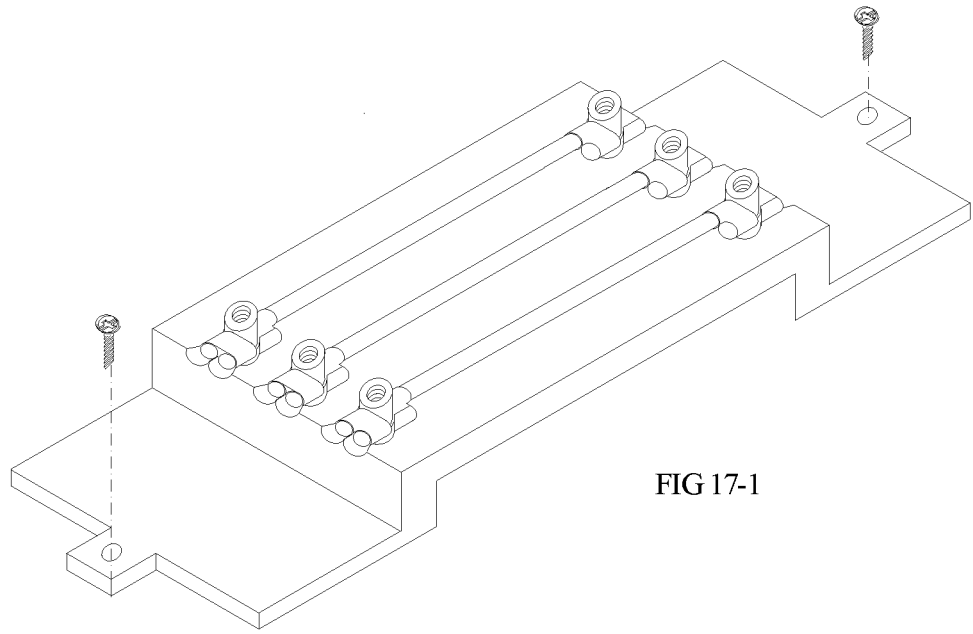
Figures 2, 17:
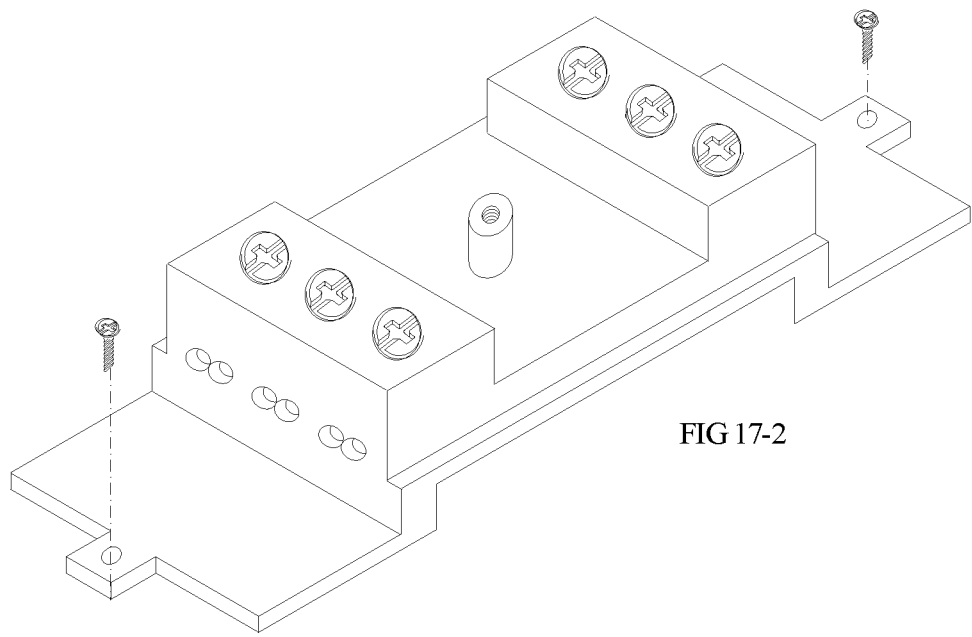

FIG. 17-1 illustrates the installation of the conductor unit on the base. It is the modification of FIG. 7-1, except that it has double tubes that electrically and physically connector to each other.

FIG. 17-2 illustrates the installation of the cap that covers and seals double connectors as FIG. 7-2 except it has 12 connected holes, six holes at each end. Three holes at either end can be used as input connection, and the rest can be used for output connection. This is called one to three connections.

Figure 18:
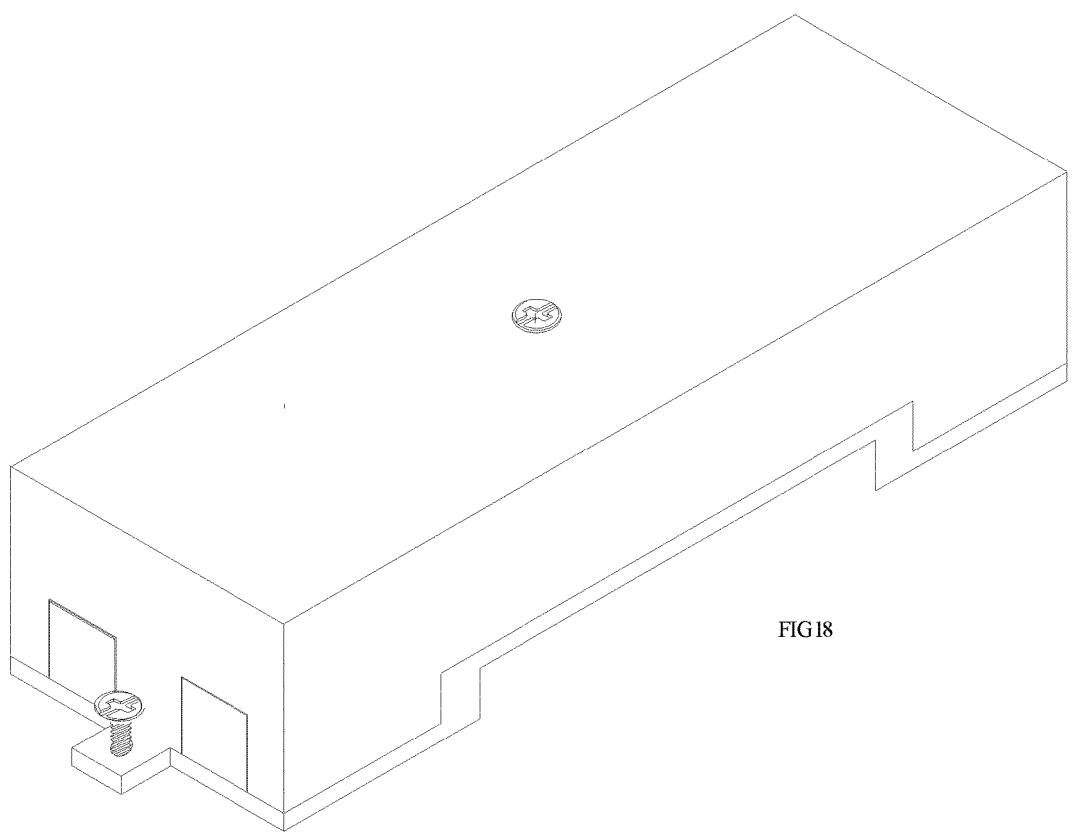
FIG. 18 illustrates the completed one to three ECB.

FIG. 18 illustrates complete one to three ECB.

Figures 1, 19:
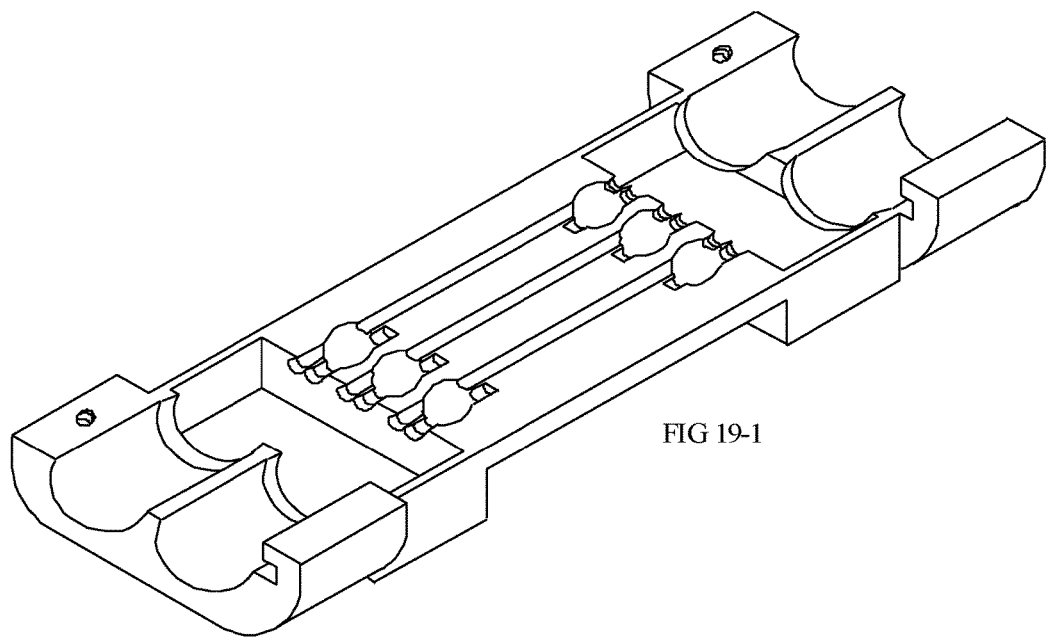
Figures 2, 19:
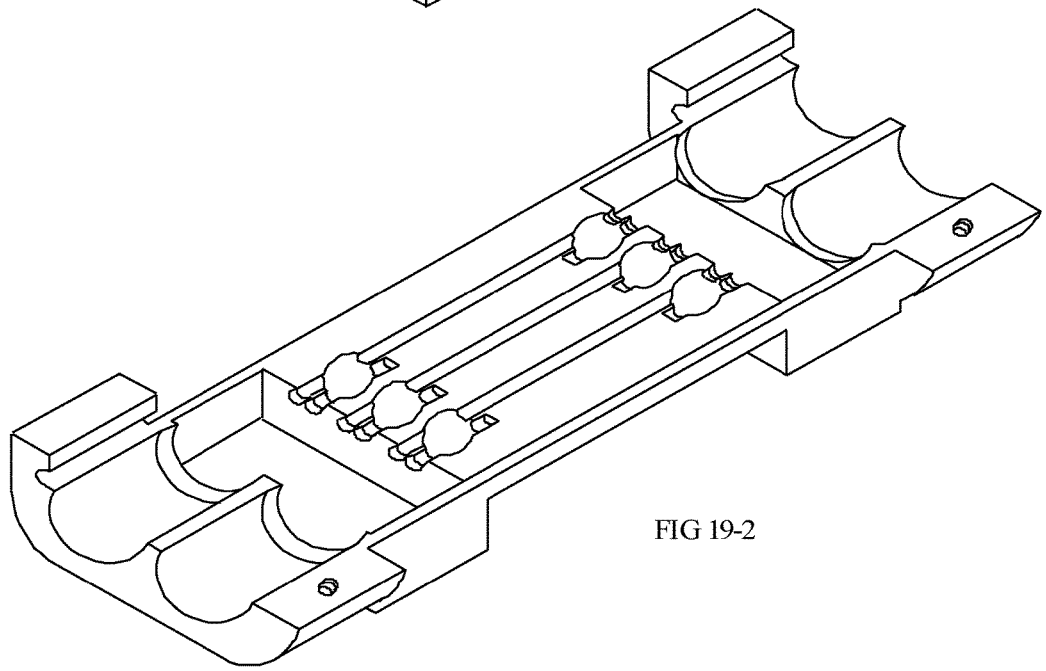

FIG. 19-1 illustrates the modification of the base in FIG. 9-1. It has all characteristics of FIG. 9-1 except it has double consecutive connector holder, and double female conduits at each end.

FIG. 19-2 illustrates the FIG. 19-1 with 180 degree rotation around the Y-axis.

FIG. 20-1 illustrates the modification of the cover in FIG. 10-1. This modification has all characteristics of FIG. 10.1. The differences are the double half female conduit.

FIG. 20-2 illustrates the FIG. 20-1 with180 degree rotation around the X-axis.

Figure 21:
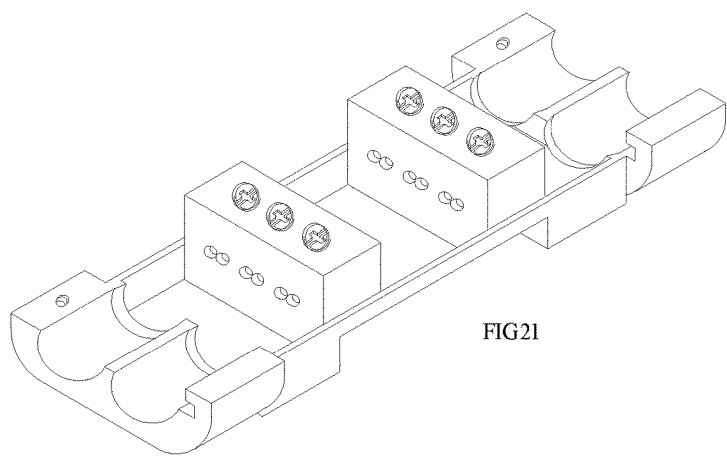
FIG. 21 illustrates the one to three electrical connector unit with half female conduit.

FIG. 21 illustrates the one to three electrical conductor unit to show the assembly before unit is covered.

Figure 22:
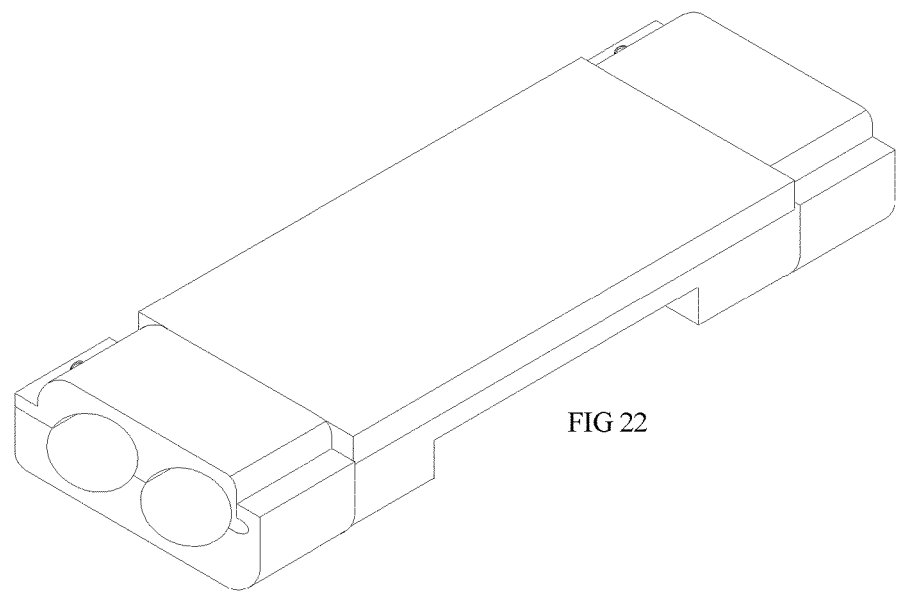
FIG. 22 illustrates the completed one to three ECB with conduit connectors.

FIG. 22 illustrates the completed one to three ECB with conduit female connectors.

The invention claimed is:

1. A convenient electrical connector box is to provide an electrical connection and a plurality of parts for use to repair the damage of a stretch out electrical line, or adding electrical lines to the existing electrical line comprising:
    (A) a conductor unit is a piece of a solid length conductive material having a plurality of conductor tubes, and a plurality of conductive threaded holes; wherein said conductor tubes are conductive tubes soldering to the ends of said conductor units; wherein said threaded holes mean holes with thread; wherein said conductive threaded holes are the cylinders made out of conductive material and having threaded holes in the middle; and wherein said conductive threaded holes soldered at 90 degree to a plurality of said conductor tubes; wherein said conductive threaded holes are used for the screw to tie down to hold the electrical wire in place;
    (B) and an electrical connector unit is a block of composite of non-conductive material and conductive material structure having a non-conductive base for housing and sealing a plurality of said conductor units; and wherein said non-conductive base having holes for screws to go through to secure said non-conductive base to existing wooden structure, and holes for screws to go through to secure the electrical wire to said conductor unit, and holes for inserting the electrical wires into said conductor tubes of said conductor unit;
    (C) and a non-conductor cover having five walls enclosed, one side opened, and a plurality of holes on the side that opposite the opened side;
    (D) and a convenient electrical connector box including screws for securing said non-conductor cover on the top of said electrical connector unit, screws for securing said non-conductor base; wherein said securing means comprised a rivet.

2. A convenient electrical connector box in according with claim 1, wherein said parts including conductor units, crews, non-conductive cover box, and non-conductive base.

3. A convenient electrical connector box in according with claim 1, wherein said conductor unit in use the naked electrical wire is inserted into said conductor tube, and the screws will be tied down to hold them in said conductor tube, the screws are the only moving part in this process.

4. A convenient electrical juncture box in according with claim 1 further comprising a plurality of female conduit connectors for using to connect with conduit for exterior use, wherein said female conduit connectors a non-conductor cylinders attaching to the ends of said electrical connector box.

5. A convenient electrical connector box in according with claim 1 having an electrical source input and a plurality electrical outputs, wherein said electrical source input is electricity supplying through a conductor to said electrical connector box, wherein said electrical outputs are electricity going out from said electrical connector box through conductors.

\* \* \* \* \*